United States Patent
Watson et al.

(10) Patent No.: US 12,372,102 B2
(45) Date of Patent: Jul. 29, 2025

(54) SYSTEM AND METHOD FOR VIBRATION CONTROL

(71) Applicant: Schlumberger Technology Corporation, Sugar Land, TX (US)

(72) Inventors: Arthur Ignatius Watson, Houston, TX (US); Stanislav Ivanov, Singapore (SG); David Milton Eslinger, Bartlesville, OK (US); Pradeep Mahadevan, Singapore (SG); Raju Ekambaram, Singapore (SG); Jaiprakash Natarajan, Singapore (SG); You Cheng Jee, Singapore (SG); Narayanan Lakshmanan, Singapore (SG)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/833,307

(22) PCT Filed: Apr. 28, 2023

(86) PCT No.: PCT/US2023/020340
§ 371 (c)(1),
(2) Date: Jul. 25, 2024

(87) PCT Pub. No.: WO2023/212287
PCT Pub. Date: Nov. 2, 2023

(65) Prior Publication Data
US 2025/0101994 A1    Mar. 27, 2025

Related U.S. Application Data (60) Provisional application No. 63/363,836, filed on Apr. 29, 2022.

(51) Int. Cl.
*F04D 29/66*    (2006.01)
*F04D 1/06*    (2006.01)
(Continued)

(52) U.S. Cl.
CPC .............. *F04D 29/669* (2013.01); *F04D 1/06* (2013.01); *F04D 13/021* (2013.01); *F04D 13/08* (2013.01);
(Continued)

(58) Field of Classification Search
CPC ...... F04D 29/669; F04D 13/08; F04D 13/086; F04D 13/021; F04D 29/044;
(Continued)

(56) References Cited

U.S. PATENT DOCUMENTS 4,898,518 A * 2/1990 Hubbard ............... F04D 29/086
417/360
4,898,523 A * 2/1990 Harwath ................. F16B 21/18
403/326

(Continued)

FOREIGN PATENT DOCUMENTS

CN    204267311 U    4/2015
JP    2013104302 A    5/2013

OTHER PUBLICATIONS

Search Report and Written Opinion of International Patent Application No. PCT/US2023/020340, Aug. 18, 2023, 10 Pages.

*Primary Examiner* — Peter J Bertheaud
(74) *Attorney, Agent, or Firm* — Jeffrey D. Frantz (57) ABSTRACT

A technique facilitates the reduction of vibration in a variety of devices which have rotating components. According to an embodiment, a system may combine a shaft, a rotor mounted along the shaft for rotation with the shaft, and a vibration reduction system. The vibration reduction system incorporates the use of a key and keyway in a manner which helps (Continued)

balance the rotor, thus reducing vibration during operation. In some applications, the vibration reduction system is able to reduce eccentric positioning of the rotor on the shaft due to, for example, assembly clearances.

18 Claims, 5 Drawing Sheets (51) Int. Cl.
    *F04D 13/02*     (2006.01)
    *F04D 13/08*     (2006.01)
    *F04D 13/10*     (2006.01)
    *F04D 29/041*     (2006.01)
    *F04D 29/043*     (2006.01)
    *F04D 29/044*     (2006.01)
    *F04D 29/047*     (2006.01)
    *F04D 29/62*     (2006.01)
    *F16C 17/02*     (2006.01)
    *H02K 5/132*     (2006.01)

(52) U.S. Cl.
    CPC ........... *F04D 13/086* (2013.01); *F04D 13/10* (2013.01); *F04D 29/0413* (2013.01); *F04D 29/043* (2013.01); *F04D 29/044* (2013.01); *F04D 29/047* (2013.01); *F04D 29/0473* (2013.01); *F04D 29/628* (2013.01); *F16C 17/02* (2013.01); *H02K 5/132* (2013.01); *F16C 2360/44* (2013.01); *F16C 2380/26* (2013.01)

(58) Field of Classification Search
    CPC ...... F04D 29/628; F04D 1/06; F04D 29/0473; F04D 29/0413; F04D 29/047; F04D 13/10; H02K 5/132; F16C 17/02; F16C 2360/44; F16C 2380/26
    See application file for complete search history.

(56) References Cited

U.S. PATENT DOCUMENTS

| | | | |
|---|---|---|---|
| 4,986,036 A * | 1/1991 | Hutchins | B24B 23/026 451/344 |
| 5,722,812 A * | 3/1998 | Knox | F04D 29/0413 415/199.1 |
| 9,322,399 B2 * | 4/2016 | Sagalovskiiy | F04D 13/10 |
| 2011/0229328 A1 | 9/2011 | Rajagopalan | |
| 2018/0045209 A1 * | 2/2018 | Nowitzki | F16D 1/0876 |
| 2020/0362859 A1 | 11/2020 | Rutter et al. | |

* cited by examiner

SYSTEM AND METHOD FOR VIBRATION CONTROL

This application is a national stage entry under 35 U.S.C. 371 of International Application No. PCT/US2023/020340, entitled "SYSTEM AND METHOD FOR VIBRATION CONTROL," filed Apr. 28, 2023, which claims the benefit of U.S. Provisional Application No. 63/363,836, entitled "SYSTEM AND METHOD FOR VIBRATION CONTROL," filed Apr. 29, 2022, the disclosure of which is hereby incorporated herein by reference.

This application claims the benefit of U.S. Provisional Application No. 63/363,836 entitled "SYSTEM AND METHOD FOR VIBRATION CONTROL," filed Apr. 29, 2022, the disclosure of which is hereby incorporated herein by reference.

BACKGROUND

In hydrocarbon well applications, electric submersible pumping systems often are used to pump fluid such as hydrocarbon-based fluids. The electric submersible pumping system may be conveyed downhole and used to pump oil from a downhole wellbore location to a surface collection location along a fluid flow path. In a variety of applications, the electric submersible pumping system employs an electric motor and a submersible, centrifugal pump which is driven by the electric motor. The electric motor uses a motor rotor and the submersible, centrifugal pump uses rotors in the form of impellers rotated within cooperating diffusers to pump well fluid. Such rotors often are assembled on a shaft and rotationally mounted to the shaft via a key and keyway. However, the clearance between the rotor and the shaft is not constant and depends on the shaft, the keyway, and key tolerances which can lead to unbalance and ultimately vibration. If multiple rotors are used with multiple keys and keyways, the keyway angular orientation can be randomized in an attempt to minimize the chance of unbalance. However, this latter approach tends to be unpredictable and therefore unreliable in sufficiently reducing vibration.

SUMMARY

In general, a system and methodology facilitate the reduction of vibration in a variety of devices which have rotating components. According to an embodiment, the system may combine a shaft, a rotor mounted along the shaft for rotation with the shaft, and a vibration reduction system. The vibration reduction system incorporates the use of a key and keyway in a manner which helps balance the rotor, thus reducing vibration during operation. In some applications, the vibration reduction system is able to reduce eccentric positioning of the rotor on the shaft due to, for example, assembly clearances.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology which facilitate the reduction of vibration in a variety of devices which have rotating components. The vibration reduction system may be used, for example, in a variety of electric submersible pumping systems, such as geothermal, water supply, and irrigation related electric submersible pumping systems. Additionally, the vibration reduction system may be used in horizontal pumping systems, line shaft pumps, hydraulic submersible pumps, and a variety of other pumps, motors, and rotatable components used in many types of devices.

According to an embodiment, the system may combine a shaft, a rotor mounted along the shaft for rotation with the shaft, and a vibration reduction system. The vibration reduction system incorporates the use of a key and keyway in a manner which helps balance the rotor, thus reducing vibration during operation. In some applications, the vibration reduction system is able to reduce eccentric positioning of the rotor on the shaft due to, for example, assembly clearances.

For example, electric submersible pumping systems utilize rotors, e.g. a motor rotor and pump impellers, mounted to a shaft for rotation in a stator and diffusers. However, the operating speed of electric submersible pumping systems has been increasing which accentuates problems resulting from elevated levels of vibration. The vibration reduction system described herein minimizes vibration by averaging out the unbalance produced. This may be accomplished by reducing eccentric positioning of the component/rotor on the shaft due to, for example, assembly clearances. In some embodiments, this reduction in eccentric positioning may be achieved by providing appropriate biasing of the component/rotor with respect to keys and keyways which coupled the component/rotor with the shaft.

With respect to a motor rotor or pump impeller, the eccentric position of such rotors on the shaft may often result from assembly clearance and applied torque force on the key. According to an embodiment, the vibration reduction system utilizes a bi-metallic key which bends as temperature rises to provide the desired biasing of the rotor and reduction in eccentricity, thus reducing vibration during operation. According to another embodiment, the vibration reduction system may incorporate two keyways on opposite sides of the shaft to improve mass balance. Sequential rotors may be keyed to alternating keyways to help reduce unwanted eccentricity. In some applications, unused portions of the keyway or keyways may be filled with half-keys. Furthermore, the keys and/or the half-keys may be bent to effectively create a spring oriented to provide the desired bias for reducing unwanted eccentricities. It should be noted that other types of springs also may be positioned between the rotors and the shaft to reduce unwanted eccentricity and to thus reduce vibration during operation.

Figure 1:
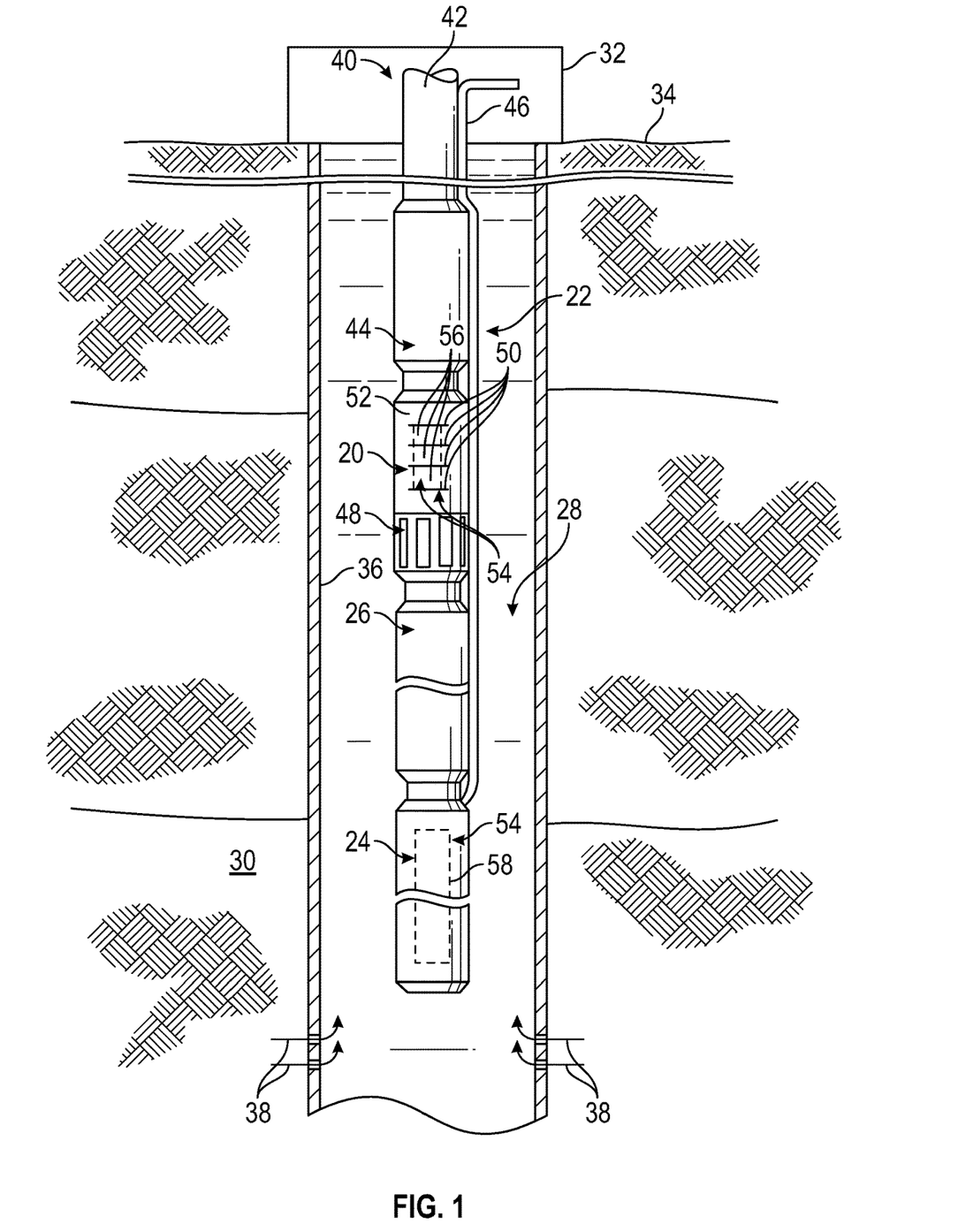
FIG. 1 is a schematic illustration of an example of an electric submersible pumping system having a submersible motor and a submersible pump with rotatable components, according to an embodiment of the disclosure.

Referring generally to FIG. 1, an example of a submersible pump 20, e.g. a submersible, centrifugal pump, is illustrated as deployed in an electric submersible pumping system 22. The illustrated embodiment is provided as an example, but numerous types, sizes, and arrangements of pumping systems 22 may be used in a variety of well related applications. By way of example, the electric submersible pumping system 22 may comprise at least one submersible motor 24 which is used to power the submersible pump 20. The pumping system 22 also may comprise a motor protector 26 which enables pressure balancing of the internal motor fluid of submersible motor 24 with respect to the surrounding environment. The submersible pump 20, submersible motor 24, and motor protector 26 are coupled together into electric submersible pumping system 22 in a manner which allows the submersible motor 24 to drive the submersible pump 20 during a downhole pumping operation.

In this example, the electric submersible pumping system 22 is deployed downhole in a wellbore 28 drilled into a formation 30 containing desirable production fluid, e.g. oil and/or other hydrocarbon-based fluids. As illustrated, the wellbore 28 extends downwardly from a wellhead 32 positioned at a surface location 34. In some applications, the wellbore 28 may be lined with a wellbore casing 36 which, in turn, may be perforated with a plurality of perforations 38. The perforations 38 extend through casing 36 and out into the surrounding formation 30. Accordingly, the perforations 38 facilitate the flow of fluids between the surrounding formation 30 and the wellbore 28.

The electric submersible pumping system 22 may be conveyed down into wellbore 28 via a suitable conveyance 40 which may be in the form of a tubing 42, e.g. coiled tubing or production tubing. However, other conveyances such as wireline or slick line also may be used to deploy submersible pumping system 22. Various types of connectors 44 may be used to couple the pumping system 22 with the conveyance 40.

Electric power is provided to submersible motor 24 by, for example, a power cable 46 routed downhole along conveyance 40 and submersible pumping system 22. When powered, the submersible motor 24 is able to drive submersible pump 20 which then draws in well fluid from wellbore 28 through a suitable pump intake 48. The well fluid is then moved (pumped) up through the submersible pump 20 and discharged into the interior of conveyance 40 (or to another suitable flow route) through which it flows to the surface.

The components of electric submersible pumping system 22 may comprise rotatable elements, i.e. rotors, which are rotated by a shaft. By way of example, submersible pump 20 may comprise a plurality of pump stages 50 arranged sequentially along the interior of a pump housing 52. Each pump stage 50 comprises a rotor 54 in the form of a pump impeller 56 which is rotated via a shaft within a corresponding diffuser. Another example of rotor 54 is a motor rotor 58 which rotates with a shaft extending through a stator of submersible motor 24. As described below, the vibration reduction system is able to reduce vibration which would otherwise occur during rotation of these and other types of rotors.

Figure 2:
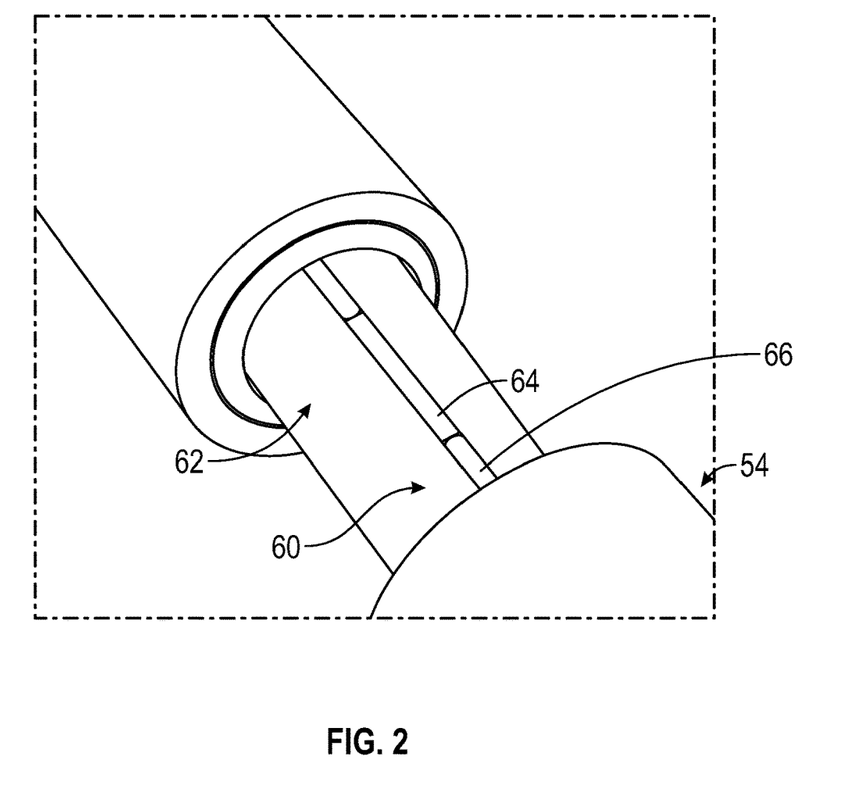
FIG. 2 is an illustration of an example of a component being mounted to a shaft via a key and keyway of a vibration reduction system, according to an embodiment of the disclosure.

Referring generally to FIG. 2, an embodiment of a vibration reduction system 60 is illustrated as being assembled between a shaft 62 and component/rotor 54. In this example, the vibration reduction system 60 comprises a key 64 and a corresponding keyway 66. The keyway 66 may be formed along shaft 62 and also along the interior of rotor 54. The key 64 is constructed to provide a spring force which biases the rotor 54 to a loaded position which removes imbalance/eccentricity caused by tolerance clearances and is thus able to reduce vibration during operation. During assembly, for example, the clearance between the rotor 54 and the shaft 62 is not constant and depends on shaft 62, rotor keyway 66, and key 64 tolerances. However, the biasing spring force provided by key 64 enables vibration reduction system 60 to remove this imbalance and to reduce vibration as the shaft 62 and rotor 54 rotate.

Figure 3:
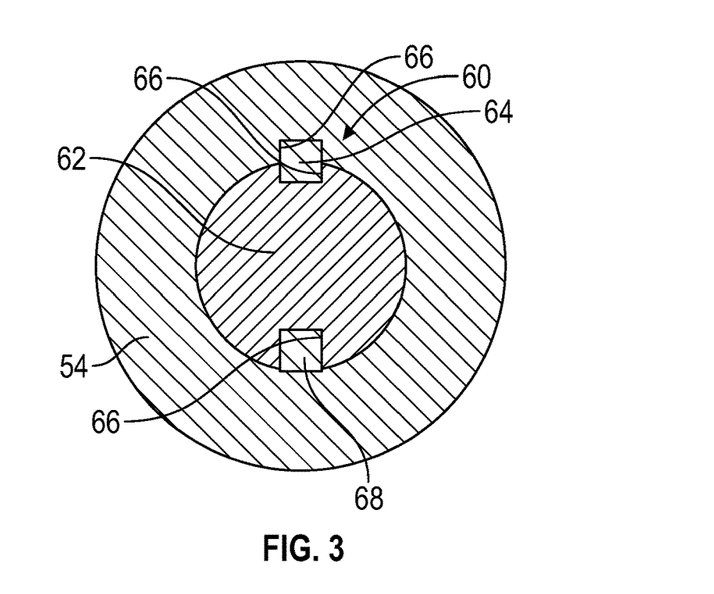
FIG. 3 is a cross-sectional illustration of an example of a component mounted on a shaft via a key and keyway which are part of a vibration reduction system, according to an embodiment of the disclosure.

In some embodiments, an additional key 68 may be positioned along shaft 62 at an angular position 180° from key 64 to further help balance mass/weighting in the assembly of shaft 62 and rotor 54, as illustrated in FIG. 3. The key 68 may effectively be half-key or simply a weight which provides a more precise balancing of the combined shaft 62 and rotor 54. If multiple rotors 54 are mounted along shaft 62, the key 64 and key 68 can be used on opposite sides of shaft 62 (i.e. with an angular spacing of 180°) for each sequential rotor 54 thus also providing an improved balancing of the combined shaft 62 and rotors 54. This improved balancing further reduces the tendency toward vibration during operation.

In some embodiments, the additional key 68 may be in the form of a spring key which provides a spring force biasing the rotor 54 with respect to the shaft 62 so as to reduce radial movement of rotating parts. In this example, the rotor 54 may be keyed to shaft 62 via key 64 for transmitting torque from the rotor 54 to the shaft 62 or vice versa. The additional key 68 and corresponding keyway 66 are located at an angular position 180° away from key 64. The keyway 66 which corresponds with additional key 68 may be deeper to accommodate key 68 in the form of a spring key. By way of example, key 68 may be a bent key which is compressed as the rotor 54 is assembled onto the shaft 62, thus applying the spring bias to the rotor 54 relative to the shaft 62. Effectively, the spring force provided by key 68 biases the rotor 54 to one side of the shaft 62 and prevents or limits radial movement of the rotor 54 during operation.

According to some embodiments, multiple rotors 54 may be mounted along shaft 62. If the multiple rotors 54 are biased to one side of the shaft via "spring" keys 68, an unbalance is created which aligns for the multiple rotors 54. However, this unbalance orientation does not excite a vibration mode shape at high speeds as effectively as would be the case if the rotors 54 were free to move radially. As described in greater detail below, some embodiments utilize controlled, e.g. alternating, biasing of the rotors 54 so as to further improve the balance.

Figure 4:
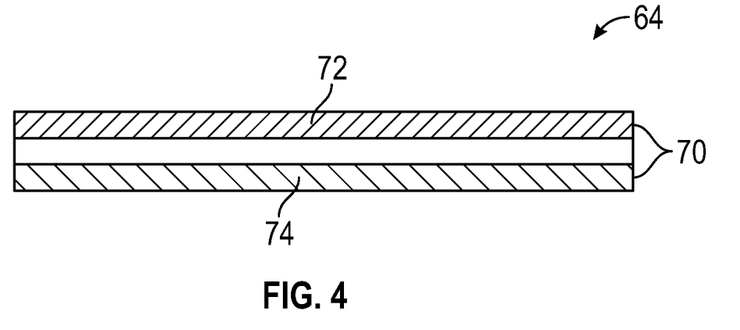
FIG. 4 is an illustration of an example of a key which may be used in a vibration reduction system, according to an embodiment of the disclosure.
Figure 5:
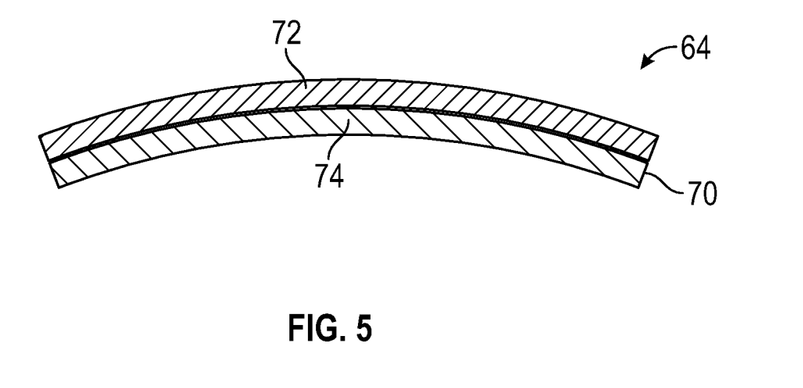
FIG. 5 is an illustration similar to that of FIG. 4 but after the key has undergone an increase in temperature, according to an embodiment of the disclosure.

According to an embodiment, the key 64 (or key 68) comprises a bi-metallic key 70 formed from a first material layer 72 and a second material layer 74, for example as shown in FIG. 4. The first material layer 72 and the second material layer 74 have a different coefficient of thermal expansion. As a result, once the layers 72, 74 are bonded together an increase in temperature causes a different level of expansion between the layers. For example, first material layer 72 may expand more than second material layer 74. This causes the bi-metallic key 70 to bend as illustrated in FIG. 5. In the example illustrated, the bi-metallic key 70 is formed from two dissimilar metals however other types of dissimilar materials potentially can be used to form key 70.

During deployment and/or operation of electric submersible pumping system 22 the shaft 62 and rotor 54 along with bi-metallic key 70 are exposed to greater heat which causes bending of the bi-metallic key 70. The heat effectively energizes the key 70 by causing it to bend and act as a spring member. As a result, the bi-metallic key 70 is able to maintain the rotor 54 in a loaded position and to thus remove imbalances/eccentricities caused by, for example, tolerance clearances. In submersible pump 20, for example, an unbalance can result due to the eccentric location of the pump impeller 56 on the shaft 62 resulting from shaft clearances and key force. Removal of the eccentricities via bi-metallic key 70 reduces vibration during rotation of the shaft 62 and rotor 54.

Figure 6:
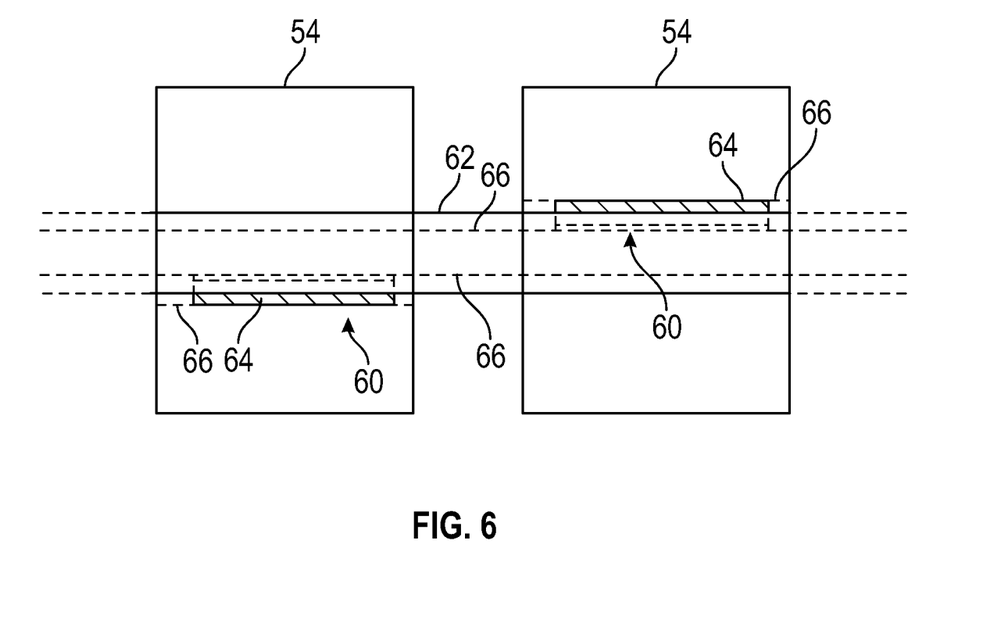
FIG. 6 is a schematic illustration of another example of components mounted on a shaft via a vibration reduction system utilizing keys and keyways, according to an embodiment of the disclosure.

Referring generally to FIG. 6, another embodiment of vibration reduction system 60 is illustrated in which multiple keyways 66 are evenly spaced angularly about the circumference of the shaft 62. By way of example, two continuous keyways 66 may be spaced at an angular position 180° apart from each other. In some applications, two sets of non-continuous keyways 66 may be positioned across from each other with 180° of angular separation. In some embodiments, multiple rotors 54, e.g. pump impellers 56, may be keyed to alternating keyways 66 to average out unbalances which are biased to the keyways 66 on the rotor 54 or on the shaft 62.

The imbalance or eccentricity may result from a variety of bias factors. For example, bias factors may include diametral clearance of the rotor 54 on the shaft 62 which permits the rotor 54 to be pushed to a position eccentric to the shaft 62 in a consistent direction due to the torque force applied via the key 64. Another bias factor may be the angular location of the keyway 66 relative to another feature on the rotor 54 or on the shaft 62 which adds or subtracts mass or moment of inertia. An additional bias factor may be the eccentricity of mass or moment of inertia of the rotor 54 (or shaft 62) in relation to its axis, e.g. induced by eccentricity in a machining or casting operation or induced by a systematic variation in density of the material forming the component. Other bias factors may include fluid-dynamic features which may result from a vane, rib, or flow passage exerting an unbalanced force on the rotor during operation.

Figure 7:
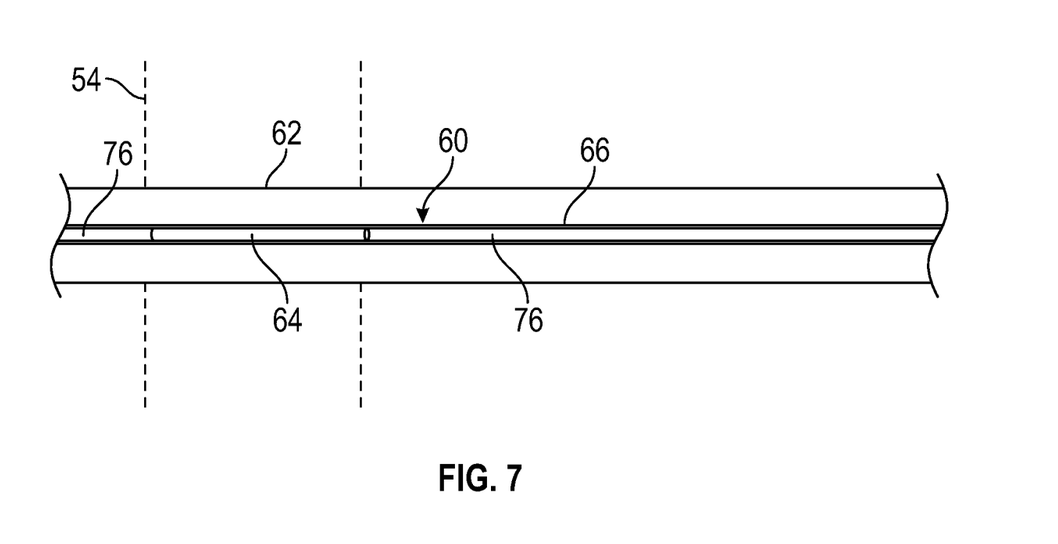
FIG. 7 is a schematic illustration of another example of a component mounted on a shaft via a vibration reduction system, according to an embodiment of the disclosure.

The vibration reduction system 60 also may comprise restoring mass balance to the shaft 62 by reducing mass/weight imbalances. Such imbalances can effectively create eccentricities which result in vibration during operation of the system, e.g. electric submersible pumping system 22. In some embodiments, the vibration reduction system 60 may reduce vibration by restoring mass balance via half-keys 76 as illustrated in FIG. 7. By way of example, use of key 64 may leave unused lengths of keyways 66. These unused lengths of keyways 66 may be filled with half-keys 76 to help restore mass balance to the shaft 62.

According to another embodiment, the vibration reduction system 60 may utilize keys 64 and/or half-keys 76 which are bent in a plane radial to the shaft 62 so as to act as a spring which applies a spring force to the rotor 54. This spring force biases the rotor 54 into stable and consistent contact with the shaft 62 on an opposite side of the shaft 62, thus reducing eccentricities and improving balance as described above. By way of example, the bend may be a shallow sinusoidal wave or a long arc. In another embodiment, a separate spring element may be utilized instead of a bend in the key 64 and/or half-key 76.

Depending on the application, the spring force and stress may be regulated to maintain a stable position of the rotor 54 relative to the shaft 62. For example, the spring force should be sufficient to resist dynamic forces on the rotor 54, particularly the centrifugal force generated by the maximum unbalance at the maximum speed of rotation. However, the spring force should not be excessive so as to minimize the force required to assemble the rotor 54 onto the shaft 62. Furthermore, the stresses should be controlled to avoid premature weakening or failure of the spring or other components. One approach to creating the spring force without creating undue difficulty with respect to assembly involves the use of bi-metallic key 70 as described above.

In some applications, the vibration reduction system 60 also may utilize multiple keyways 66 in the rotor 54 with a single keyway 66 along the shaft 62. With multiple rotors 54, alternating keyways in sequential rotors 54 may be keyed to the shaft 62 while the unused keyways 66 are filled with half-keys 76. By way of further example, one keyway 66 may be provided in each rotor 54 and along the shaft 62. Multiple versions of the rotor 54 may be deliberately manufactured with different positions of the keyway with respect to an unbalance or bias of the rotor 54.

For example, two versions of the rotor 54 may be constructed with keyways 66 on opposite sides of the rotor 54 with respect to a mass or moment of inertia feature or with respect to a fluid-dynamic feature. The two versions may be assembled to the shaft 62 in an alternating fashion with respect to the unbalance or bias so as to help minimize the unbalance or bias. This embodiment also may be combined with other embodiments described herein which utilize a spring bias, e.g. a bi-metallic key, bent key, or other type of spring to reduce imbalances caused by, for example, tolerance clearances.

Figure 8:
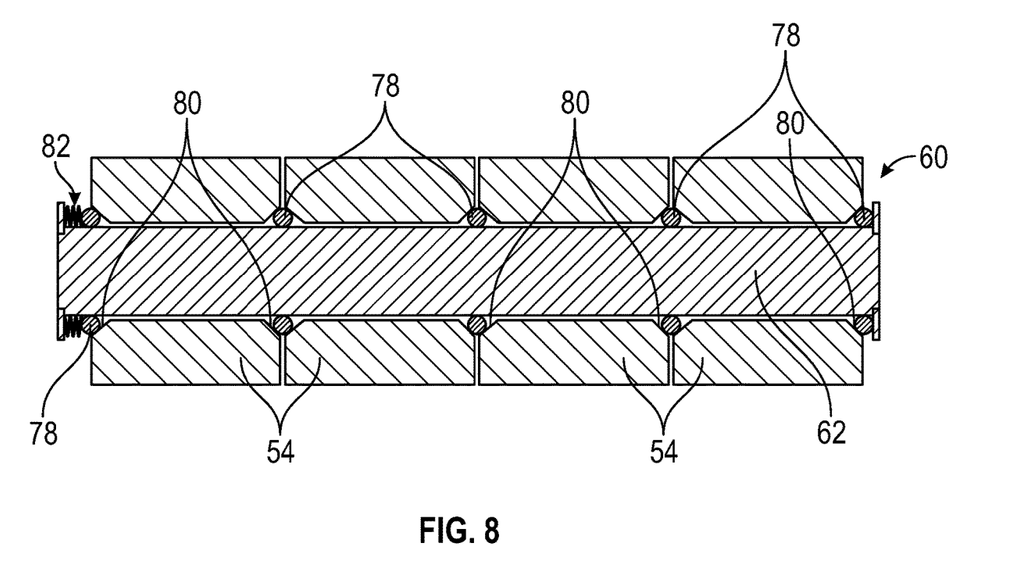
FIG. 8 is a schematic illustration of another example of a component mounted on a shaft via a vibration reduction system, according to an embodiment of the disclosure.

Referring generally to FIG. 8, another embodiment of vibration reduction mechanism 60 is illustrated which employs centralizer rings 78 positioned to center the rotor or rotors 54 on the shaft 62 regardless of the radial clearance between the rotor(s) 54 and the shaft 62. By way of example, the rings 78 may comprise elastomer rings, metal rings, garter springs, or other mechanisms able to compress uniformly about their circumference and to thus bias the rotor(s) 54 to a centered position on the shaft 62. The rings 78 may be captured in corresponding recesses 80 formed in rotor 54 or between rotors 54. By way of example, the recesses 80 may be formed via chamfers as illustrated. The rings 78 effectively serve as a mechanism which prevents radial movement between the shaft 62 and rotor 54 during operation, thus reducing vibration. In some embodiments, a spring bias member 82, e.g. a plurality of Belleville washers, may be mounted along shaft 62 to also apply a longitudinal biasing force on rotor(s) 54 relative to shaft 62. This longitudinal biasing force may be used to facilitate the function of rings 78 and/or to take up tolerances.

Figure 9:
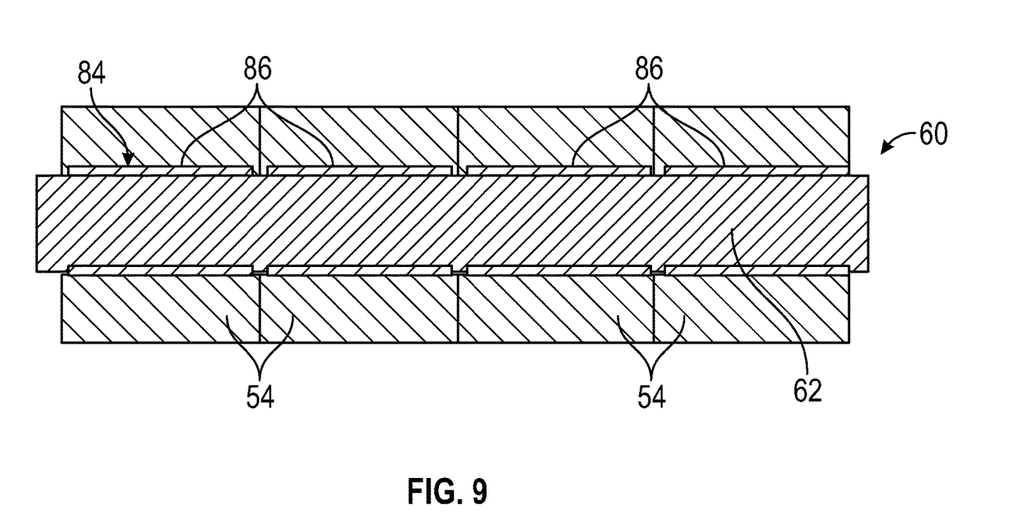
FIG. 9 is a schematic illustration of another example of a component mounted on a shaft via a vibration reduction system, according to an embodiment of the disclosure.

Referring generally to FIG. 9, another embodiment is illustrated which similarly provides a centering bias with respect to the rotor(s) 54 mounted on shaft 62. In this example, a centering mechanism 84 may be applied throughout the length of the rotor(s) 54 via centering members 86 which may be in the form of flat shims, an axially corrugated structure, tolerance rings, or other centering members. It should be noted that the biasing or centering mechanisms, e.g. rings 78 or members 86, may be selected and constructed with specific thermal expansion characteristics to maintain or adjust the biasing or centering effect on the rotor(s) 54 as operating temperatures change.

Depending on the parameters of a given application and/or environment, the structure of submersible pump 20 and/or electric submersible pumping system 22 may be adjusted. For example, the submersible pumping system 22 may be in the form of an electric submersible pumping system combined with other components for use in a wellbore or other type of borehole. Similarly, the vibration reduction system 60 may be positioned between many types of rotors 54 and shafts 62. In electric submersible pumping system applications, the rotors 54 may comprise various types of pump impellers and motor rotors. Additionally, the vibration reduction system 60 may utilize various combinations of features described above to help minimize vibration during operation of electric submersible pumping system 22. The vibration reduction system 60 also may be used in a variety of other pumping systems or systems utilizing components which rotate with a shaft while being keyed to the shaft.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for pumping a fluid, comprising:
an electric submersible pumping system having a component mounted to a shaft for rotation with the shaft, the component being rotationally secured to the shaft via a vibration reduction system utilizing a key and a keyway arranged to reduce eccentricities of the component relative to the shaft, wherein:
the key includes a first layer of a first metal bonded to a second layer of a second metal; and
a coefficient of thermal expansion of the first metal is different from a coefficient of thermal expansion of the second metal such that the key bends in response to heating of the key during operation of the electric submersible pumping system.

2. The system as recited in claim 1, wherein the vibration reduction system comprises a plurality of keys located in corresponding keyways, each pair of keys being positioned along the shaft at an angular position 180° from each other.

3. The system as recited in claim 1, wherein the vibration reduction system comprises a plurality of keys and keyways, and portions of the keyways unused by the keys contain half-keys to restore mass balance to the shaft.

4. The system as recited in claim 3, wherein each half-key comprises a bend which causes the half-key to act as a spring forcing the component into stable and consistent contact with the shaft.

5. The system as recited in claim 1, wherein the component comprises a plurality of components and the vibration reduction system comprises a corresponding key and keyway associated with each component, the key and keyway of each component being located at an angular position 180° from the key and keyway associated with a next sequential component of the plurality of components.

6. The system as recited in claim 1, wherein the vibration reduction system uses a spring force to bias the component into stable and consistent contact with the shaft.

7. The system as recited in claim 1, wherein the component comprises a pump impeller.

8. The system as recited in claim 1, wherein the component comprises a motor rotor.

9. A system, comprising:
a shaft;
a rotor mounted along the shaft for rotation with the shaft; and
a vibration reduction system disposed between the shaft and the rotor, the vibration reduction system utilizing a first key disposed in a first keyway in the shaft and a second key disposed in a second keyway in the shaft, wherein the first keyway extends to a first depth in the shaft and the second keyway extends to a second depth in the shaft, the second depth different from the first depth,
wherein the first key comprises a bi-metallic key which bends with increasing temperature to reduce eccentric positioning of the rotor on the shaft due to assembly clearances.

10. The system as recited in claim 9, wherein the first and second keyways are located at angular positions separated by 180° about the shaft.

11. The system as recited in claim 9, wherein the vibration reduction system comprises additional keys and keyways located at angular positions separated by 180° about the shaft, and wherein the rotor comprises a plurality of rotors mounted along the shaft via the additional keys and keyways.

12. The system as recited in claim 9, wherein unused portions of the first and second keyways contain half-keys to restore mass balance to the shaft.

13. The system as recited in claim 9, wherein each of the first and second keys includes a bend which causes the first and second keys to act as springs which force the rotor into stable and consistent contact with the shaft.

14. The system as recited in claim 9, wherein the vibration reduction system comprises a biasing mechanism which uses a spring force to bias the rotor into stable and consistent position with respect to the shaft.

15. The system as recited in claim 9, wherein:
the first key includes a first layer of a first metal bonded to a second layer of a second metal; and
a coefficient of thermal expansion of the first metal is different from a coefficient of thermal expansion of the second metal such that the first key bends in response to heating of the first key during operation of the system.

16. A method, comprising:
mounting a rotor on a shaft for rotation with the shaft; and
using a vibration reduction system between the rotor and the shaft, the vibration reduction system applying a bias to the rotor to force the rotor into stable and consistent contact with the shaft, wherein:

the vibration reduction system includes a key disposed in a keyway;

the key includes a first layer of a first metal bonded to a second layer of a second metal; and a coefficient of thermal expansion of the first metal is different from a coefficient of thermal expansion of the second metal such that the key forms a bend in response to heating of the key during operation of the rotor, the bend of the key applying the bias to the rotor.

17. The method as recited in claim 16, wherein mounting the rotor comprises mounting a pump impeller, of a submersible, centrifugal pump, to the shaft.

18. The method as recited in claim 16, wherein mounting the rotor comprises mounting a motor rotor, of an electric submersible pumping system, to the shaft.

\* \* \* \* \*